(12) United States Patent
Baryshnikov et al.

(10) Patent No.: US 8,355,324 B2
(45) Date of Patent: Jan. 15, 2013

(54) METHOD AND APPARATUS FOR FILTERING DATA PACKETS

(75) Inventors: Yuliy Baryshnikov, New York, NY (US); Eric Henry Grosse, Berkeley Heights, NJ (US); Dan Romik, New York, NY (US); Francis X. Zane, New Providence, NJ (US)

(73) Assignee: Alcatel Lucent, Paris (FR)

( * ) Notice: Subject to any disclaimer, the term of this patent is extended or adjusted under 35 U.S.C. 154(b) by 775 days.

(21) Appl. No.: 11/712,716

(22) Filed: Mar. 1, 2007

(65) Prior Publication Data
US 2008/0212597 A1 Sep. 4, 2008

(51) Int. Cl.
*H04J 1/16* (2006.01)
*G06F 9/00* (2006.01)
*G06F 11/00* (2006.01)
*G06F 12/14* (2006.01)

(52) U.S. Cl. ............... 370/230; 726/13; 726/22; 726/23
(58) Field of Classification Search ................... None
See application file for complete search history.

(56) References Cited

U.S. PATENT DOCUMENTS

| | | | |
|---|---|---|---|
| 7,020,698 B2 | 3/2006 | Andrews et al. | |
| 7,185,103 B1 | 2/2007 | Jain | |
| 7,203,963 B1 | 4/2007 | Wu et al. | |
| 7,234,168 B2 * | 6/2007 | Gupta et al. | 726/25 |
| 7,331,060 B1 * | 2/2008 | Ricciulli | 726/22 |
| 2002/0046291 A1 * | 4/2002 | O'Callaghan et al. | 709/238 |
| 2005/0198519 A1 * | 9/2005 | Tamura et al. | 713/188 |
| 2006/0272018 A1 * | 11/2006 | Fouant | 726/23 |
| 2009/0144820 A1 * | 6/2009 | Kurapati et al. | 726/22 |

FOREIGN PATENT DOCUMENTS
JP 2004-140524 A 5/2004

OTHER PUBLICATIONS http://en.wikipedia.org/wiki/Denial-of-service_attack, downloaded on Mar. 1, 2007 (9 pages).
T.M. Gil et al., "Multops: A Data-Structure for Bandwidth Attack Detection," Proceedings of the $10^{th}$ Usenix Security Symposium Usenix Assoc Berkley, CA, USA, Aug. 15, 2001, XP002221251.
Japanese Office Action dated Aug. 9, 2011 issued in corresponding Japanese Application No. 2009-551749.
Chinese Office Action dated Jun. 5, 2012 issued in correspoding Chinese Application No. 200880006841.6 and English translation thereof.

* cited by examiner

*Primary Examiner* — Faruk Hamza
*Assistant Examiner* — Cassandra Decker
(74) *Attorney, Agent, or Firm* — Harness, Dickey & Pierce, P.L.C.

(57) ABSTRACT

Disclosed is a method and apparatus for filtering received data packets. A hierarchical tree is maintained. The tree includes nodes organized in a plurality of levels. Each level above a root node of the tree has one or more of the nodes, with each of the one or more of the nodes corresponding to a particular value of a segment of an Internet Protocol (IP) address. The segment is the same for each node of a particular level of the tree. Each node at a particular level of the tree stores a number representative of the number of received packets having the same value for the segment of the IP address associated with the particular level. Some of the received data packets are filtered out based on the hierarchical tree.

21 Claims, 4 Drawing Sheets

METHOD AND APPARATUS FOR FILTERING DATA PACKETS

BACKGROUND OF THE INVENTION

The present invention relates generally to network security, and more particularly to Denial of Service (DDoS) attacks.

During a DDoS attack, a number of compromised computers often send unwanted and heavy traffic (i.e., data packets) to a recipient computer system (e.g., a web server, network links, a router, etc.). This unwanted traffic typically exhausts the recipient computer's resources and prevents the recipient computer from serving its legitimate clients.

To defend against a DDoS attack, the recipient computer typically must distinguish between undesired traffic and legitimate traffic. Once the undesired traffic is identified, the recipient computer can filter (e.g., block) the undesired traffic so that it does not overload the resources of the recipient computer.

Since the unwanted traffic is often being transmitted by many compromised computers, it is often difficult for the recipient computer to identify (and filter) undesired traffic from legitimate traffic. The recipient computer typically has to determine whether each received packet is part of the undesired traffic or is legitimate traffic. This analysis usually requires the computer to examine the source Internet Protocol (IP) address of each received packet.

Every packet has a source Internet Protocol (IP) address. An IP address typically has the form a.b.c.d, where a, b, c, and d are integers in the range of 0-255.

One filtering technique used to counter a DDoS attack is to determine which traffic to filter before the recipient computer is incorporated into the network (i.e., static filtering). For example, if a compromised computer is known to take part in DDoS attacks, the recipient computer may be configured to filter (e.g., block) all packets received from that compromised computer.

Static filtering typically requires the recipient computer to examine the complete IP address of each packet and compare the IP address to IP addresses on a list of IP addresses suspected of taking part in DDoS attacks.

BRIEF SUMMARY OF THE INVENTION

There remains a need for a technique to more efficiently and effectively filter packets to combat a distributed denial of service attack.

In accordance with an embodiment of the present invention, a recipient computer examines one or more portions or segments of a received packet's IP address to dynamically filter the received packet and reduce the likelihood of success of a DDoS attack.

In accordance with an embodiment of the present invention, a hierarchical tree having a plurality of nodes organized in a plurality of levels is maintained. Each level above a root node of the tree has one or more of the nodes, with each of the one or more of the nodes corresponding to a particular value of a segment of an Internet Protocol (IP) address. The segment is the same for each node of a particular level of the tree. Each node at a particular level of the tree stores a number representative of the number of received packets having the same value for the segment of the IP address associated with the particular level. Some of the received data packets are filtered out based on the hierarchical tree.

In one embodiment, received data packets having a particular value for one segment of a source IP address are filtered out when a node corresponding to the particular value of the one segment has a number of child nodes greater than a child node threshold value.

A child node of the node corresponding to the particular value of the one segment is generated in response to the number stored in the particular node being greater than an overflow threshold (e.g., associated with the node, the tree, etc.).

In one specific embodiment, the maintaining of the hierarchical tree includes performing several steps after receiving a packet having a first value for a first segment of an IP address and a second value for a second segment of an IP address. The steps include determining a current level node at a current level for the packet. The current level node stores a number representative of a number of the received packets having the first value for the first segment of the IP address. The steps include incrementing the stored number (i.e., an overflow counter associated with the current level node) if the stored number (the overflow counter) is less than an overflow threshold value (e.g., for the current level node). A child node of the current level node at a next level of the tree is then determined if the stored number is greater than the overflow threshold for the current level node. The child node represents a number of the received packets having the first value for the first segment of the IP address and the second value for the second segment of the IP address. The steps include incrementing a number of child nodes of the current level node after performing the step of creating the child node. In some embodiments, the above steps can be repeated until the number of child nodes of the current level node is greater than the child node threshold value.

In one specific embodiment of the method, the steps include filtering the received packet (e.g., that was blocked) when the number of child nodes of the current level node is greater than the child node threshold value. Further, each node may have a leakage parameter which the method may use to decrement the overflow counter associated with a node (e.g., at a predetermined rate). Further, the steps may include independently adjusting the child node threshold value and overflow threshold value, for example using statistics on normal usage of the system during times without an attack.

These and other advantages of the invention will be apparent to those of ordinary skill in the art by reference to the following detailed description and the accompanying drawings.

DETAILED DESCRIPTION

Figure 1:
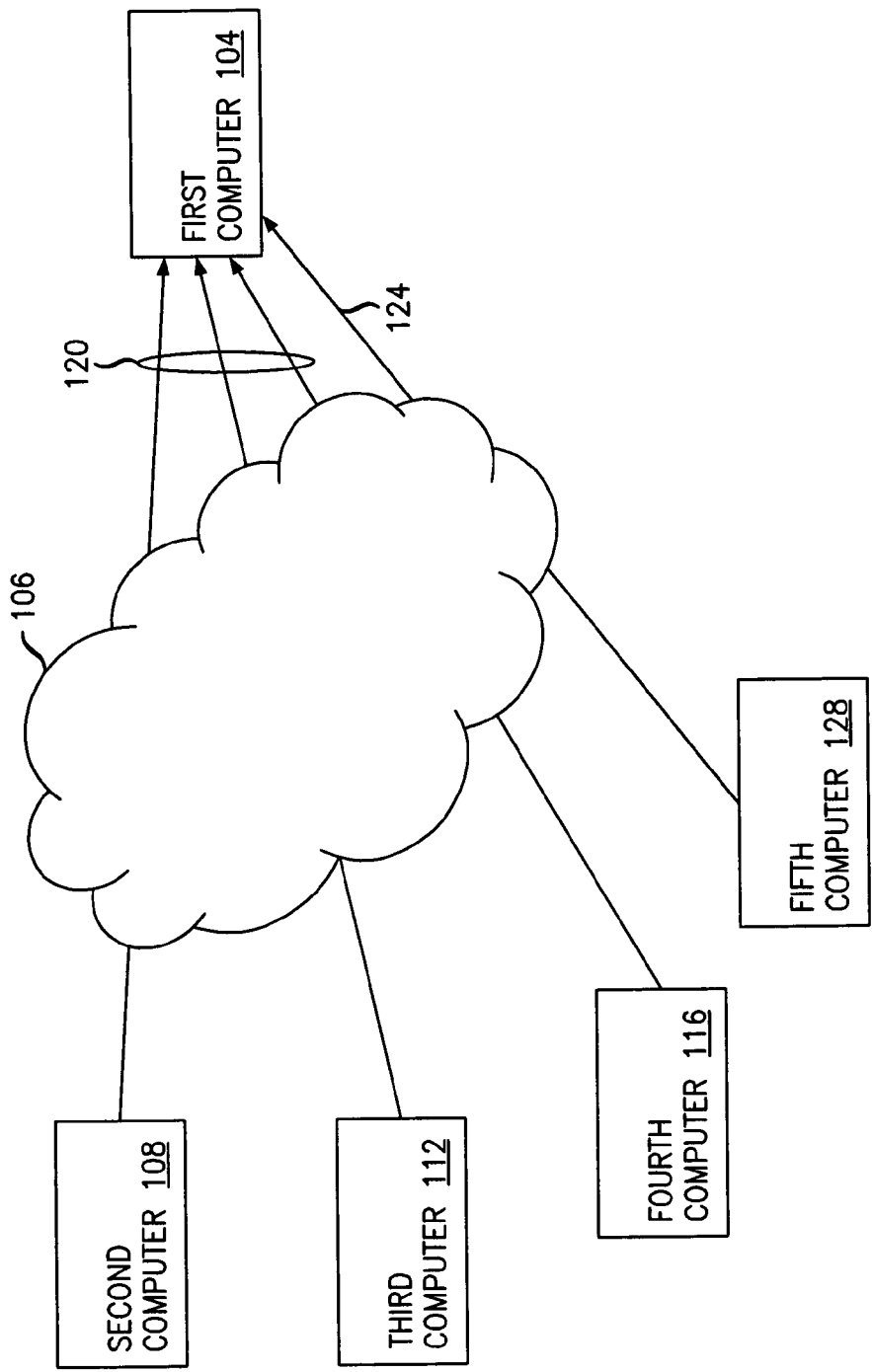
FIG. 1 shows an exemplary block diagram of a first computer being subjected to a distributed denial of service attack over a network.

FIG. 1 is an exemplary block diagram of a first computer 104 (e.g., a web server, a router, etc.) that is being subjected to a distributed denial of service (DDoS) attack over network 106. During a DDoS attack, a number of compromised computers, such as a second computer 108, a third computer 112, and a fourth computer 116, send unwanted traffic (i.e., data packets) 120 to the first computer 104. This unwanted traffic 120 typically is at such a high rate that it exhausts the first computer's resources and prevents the first computer 104 from serving its legitimate clients. For that reason, a DDoS attack may crash the first computer 104.

To defend against a DDoS attack, the first computer 104 typically must distinguish between undesired traffic 120 and legitimate traffic, such as legitimate traffic 124 from a fifth computer 128. Once the first computer 104 identifies the undesired traffic 120, the first computer can filter (e.g., block) the undesired traffic 120 so that the traffic does not overload the resources of the first computer 104.

Since the unwanted traffic 120 is being transmitted by many computers in DDoS attacks, it may be difficult to identify (and filter) undesired traffic 120 from legitimate traffic 124. The first computer 104 typically has to determine whether each received packet is part of the undesired traffic 120 or is legitimate traffic 124. Such an analysis can require the first computer 104 to perform static filtering and examine the complete Internet Protocol (IP) address of each received packet.

Figure 2:
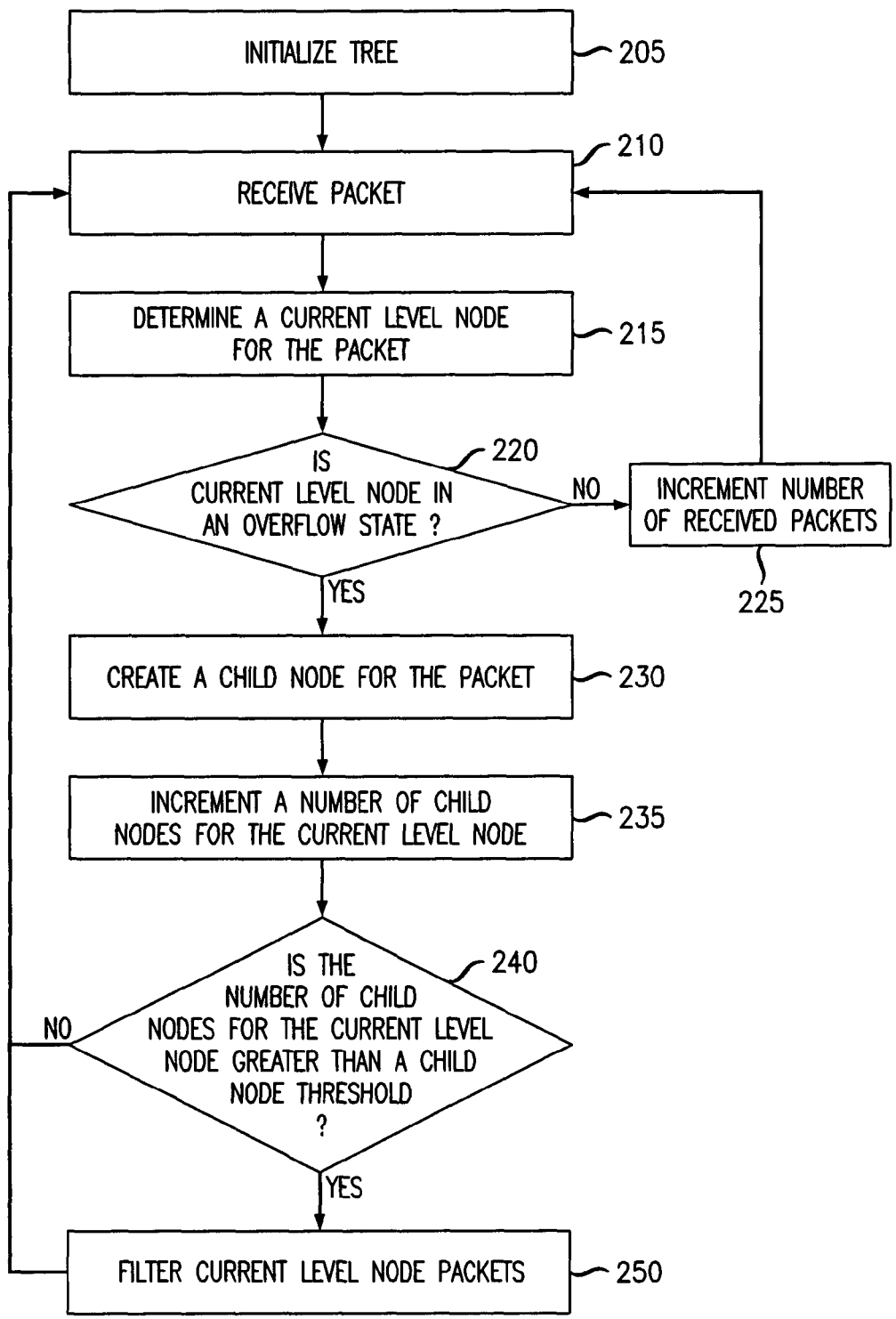
FIG. 2 is a flowchart showing the steps performed by a computer to filter packets in accordance with an embodiment.

FIG. 2 is a flowchart showing the steps performed by a first computer (also referred to herein as a computer) to dynamically filter packets in accordance with an embodiment of the present invention. The flowchart of FIG. 2 will first be described at a high level, with further details given when an example is described below.

The computer first initializes a hierarchical tree data structure (referred to herein as a tree) in step 205. The tree has a plurality of nodes organized in a plurality of levels. Each level is associated with a segment of an IP address (e.g., one byte of the IP address) and each node at a particular level stores a number representative of the number of received packets having a same value for the segment of the IP address associated with the particular level. In one embodiment, the tree is initialized only with a root node and subnodes of the root node are added to the tree as packets are received.

The computer then receives a packet in step 210. The packet has a first value for a first segment of its IP address and a second value for a second segment of its IP address. A current level node for the packet is then determined in step 215. The current level node is at a current level and represents a number of received packets having the first value for the first segment of the IP address. The current level node is a node that is at a level corresponding to the first segment of the IP address.

To find the current level node, a segment of the complete IP address of the packet is analyzed in light of the nodes in the tree. When the node that matches the segment at the current level is found, a next segment of the IP address is analyzed and a node that matches the next segment is located at the next level of the tree. These steps are repeated. The current level node is therefore the deepest matching node in the tree. This process is often referred to as the longest prefix match (It may also be referred to as longest first segment match.). As a result, the first segment (and therefore the current level node) are not static in nature but rather may change for each packet. The first segment corresponds to the segment of the packet's IP address that matches a node (i.e., the current level node).

It is then determined whether the current level node is in an overflow state in step 220. This determination can be made by comparing the number of received packets having the first value for the first segment of the IP address with an overflow threshold. In one embodiment, the overflow threshold is specific for each node (e.g., a specific overflow threshold for the current level node). Alternatively, there is one overflow threshold for all of the nodes at a level or alternatively in the entire tree. If the number of received packets having the first value for the first segment of the IP address is less than or the same as the overflow threshold (e.g., for the current level node), the current level node is not in an overflow state and the stored number representative of the number of received packets having the first value for the first segment of the IP address is incremented in step 225. The process then returns to step 210 and repeats.

If the stored number (representing the number of received packets having the first value for the first segment of the IP address) is greater than the overflow threshold, the current level node is in an overflow state and a child node of the current level node is created in step 230 for the packet. The child node is at a level numerically above (e.g., second level to third level) the current level (but can be viewed graphically as a level below the current level in the tree) and represents a number of received packets having the first value for the first segment of the IP address and a second value for the second segment of the IP address, e.g., a disjoint second segment of the IP address.

A counter corresponding to a number of child nodes of the current level node is then created or incremented in step 235. The computer then determines in step 240 whether the counter of the number of child nodes of the current level node is greater than a child node threshold. If not, the process returns to step 210 and repeats.

If the number of child nodes of the current level node is greater than the child node threshold, packets that are associated with the current level node are filtered out in step 250. Thus, the computer filters out received data packets having the first value for the first segment of the IP address. The process then returns to step 210.

As described above, each segment of an IP address is an integer between 0 and 255. Thus, in one embodiment, there are four levels, and the maximum number of child nodes for each level is 256. However, alternative embodiments exist, including but not restricted to those with 32 levels and two child nodes per level, 16 levels and 256 child nodes per level, and 128 levels and 2 child nodes per level, covering both Internet Protocol version 4 and version 6 address conventions.

Figure 3:
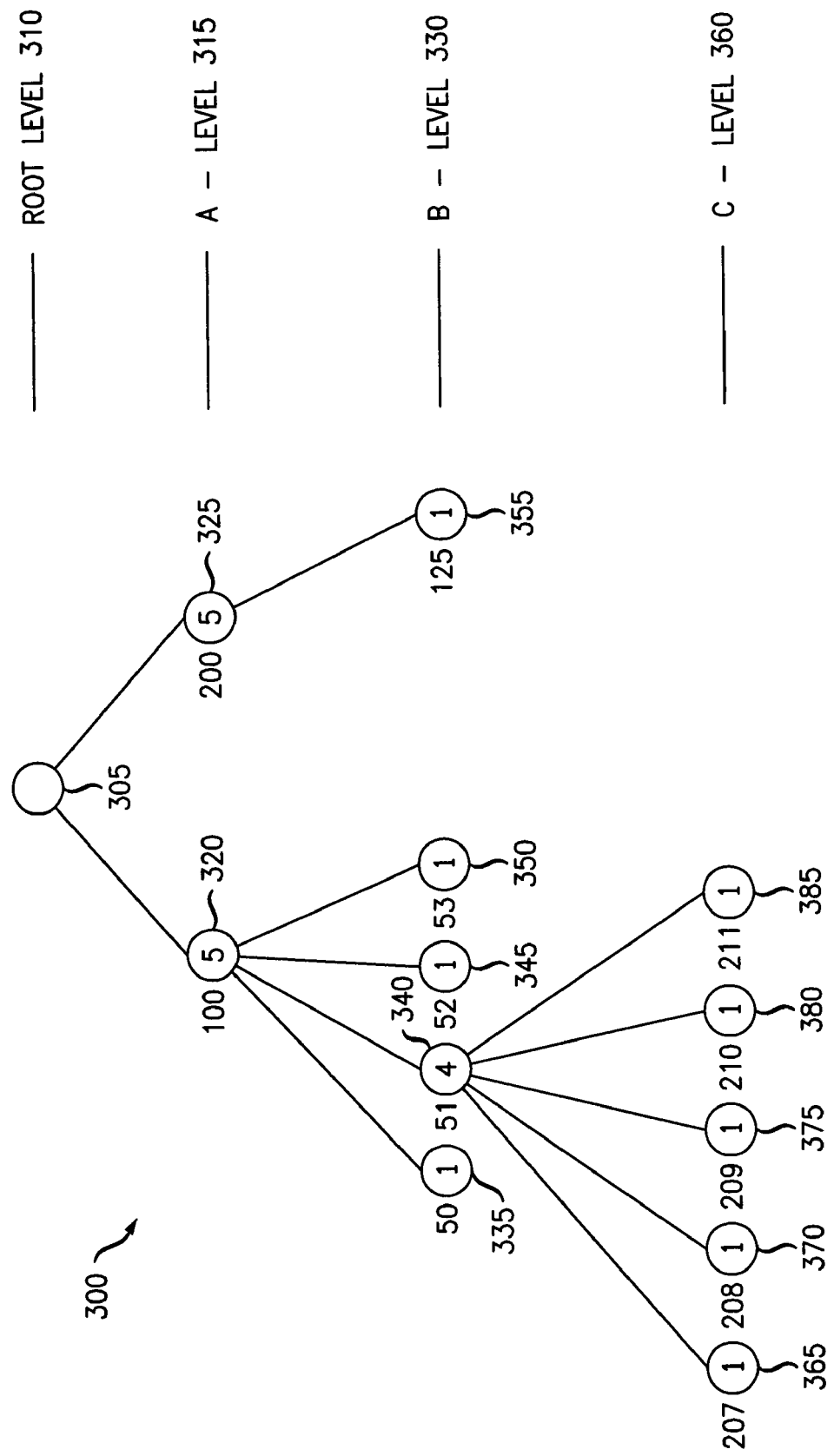
FIG. 3 is a block diagram of a tree data structure in accordance with an embodiment, e.g., the embodiment of FIG. 2.

FIG. 3 shows an example of a tree 300 in accordance with an embodiment of the present invention. The computer needs to determine whether or not any of the packets it receives are part of a DDoS attack. If the computer determines that some or all of the packets are part of a DDoS attack, the computer filters the packets. The computer uses the tree 300 to make this determination.

Suppose the computer is receiving many packets from each of the following IP addresses:
 100.50.207.124,
 100.51.207.91,
 100.51.208.6,
 100.51.209.121,
 100.51.210.14,
 100.51.211.251,
 100.52.05.44,
 100.53.68.148,
 200.125.65.188, and
 200.188.251.12.

The tree 300 has a root node 305 which represents a universal or root level 310. The root level 310 is the highest level of the tree 300. Below the root level 310 is an a-level 315 corresponding to the a-segment of an IP address of the form a.b.c.d (as described above). For example, the IP address of 100.52.05.44 shown above is of the form a.b.c.d, where 100=a, 52=b, 05=c, and 44=d. In one embodiment, the computer creates two a-level nodes—a first a-level node 320 and a second a-level node 325. The first a-level node 320 represents a number of received packets having an a-level address of 100 (e.g., packets having an IP address of 100.50.207.124 or 100.52.05.44). The second a-level node 325 represents a number of received packets having an a-level address of 200 (e.g., packets having an IP address of 200.125.65.188 or 200.188.251.12).

In one embodiment, each node in the tree 300 shown in FIG. 3 is represented by a circle with a number inside the circle. This number represents an overflow counter. The overflow counter represents the number of received data packets having the same value for the segment of the IP address associated with the particular level. Each node or level can also have a corresponding overflow threshold. When the number of received data packets having the same value for the segment of the IP address associated with the particular level is greater than the overflow threshold, then the computer has to create a child node of the current level node.

For example, the number 5 is located within each of the two a-level nodes 320 and 325. This means that at least 5 packets have been received for each a-level address 100 and 200. More than 5 packets may have been received for either or both of the a-level addresses 100 or 200 because of the overflow threshold. For example, suppose the overflow threshold for the a-level nodes of tree 300 is equal to 4. Because both a-level nodes 320, 325 have 5's inside the node, the a-level nodes 320, 325 are in their overflow state and their overflow counter is no longer incremented. Instead, received packets that have an a-level address of 100 or 200 are analyzed with respect to a next level, such as a b-level 330. This next level (e.g., b-level 330) may be created when a packet is received or may have been created previously (e.g., with the creation of the tree). Thus, when the computer receives another packet having an a-level address of 100 (or 200), the computer first determines that the a-level node 320 (or 325) is in an overflow state. The computer then analyzes this packet with respect to the b-level 330.

Under the first a-level node 320, there are four b-level nodes 335, 340, 345, 350. The first b-level node 335 corresponds to packets having a b-level address of 50 (i.e., 100.50) and has an overflow counter of 1. The second b-level node 340 corresponds to packets having a b-level address of 51 (i.e., 100.51) and has an overflow counter of 4. The third b-level node 345 corresponds to packets having a b-level address of 52 (i.e., 100.52) and has an overflow counter of 1. The fourth b-level node 350 corresponds to packets having a b-level address of 53 (i.e., 100.53) and has an overflow counter of 1.

Similarly, under the second a-level node 325, there is a fifth b-level node 355. The fifth b-level node 355 corresponds to b-level address 125 (i.e., 200.125) and has an overflow counter of 1.

Suppose that the b-level (i.e., each node at the b-level) has an overflow threshold of 3. Therefore, the b-level nodes (e.g., nodes 335, 345, 350, and 355) that have an overflow counter of 1 are not currently in an overflow state. As a result, the next level in the tree (a c-level 360) does not need to be analyzed for these nodes 335, 345, 350, 355.

The second b-level node 340, however, has an overflow counter that is greater than the overflow threshold of 3. As a result, the second b-level node 340 is in an overflow state and the computer no longer increments the second b-level node's counter. Instead, the c-level is used for received packets when the second b-level node is in an overflow state.

As stated above, suppose the computer receives the following five packets under the a-level address of 100 and the b-level address of 51:

100.51.207.91,
100.51.208.6,
100.51.209.121,
100.51.210.14, and
100.51.211.251.

The b-level node 340 is in an overflow state and so packets are then analyzed at the c-level. Five c-level nodes are then created: a first c-level node 365 that corresponds to packets having a c-level address of 207, a second c-level node 370 that corresponds to packets having a c-level address of 208, a third c-level node 375 that corresponds to packets having a c-level address of 209, a fourth c-level node 380 that corresponds to packets having a c-level address of 210, and a fifth c-level node 385 that corresponds to packets having a c-level address of 211. Each has an overflow counter of 1 and, assuming the overflow threshold for the c-level is 2, no c-level node is in an overflow state. Therefore, a d-level node does not have to be created for any of the received packets.

In one embodiment, each time the computer generates a next level node, a child node counter that is associated with the current node (i.e., the parent node) is incremented. For example, each time a c-level node 365-385 is generated, a child node counter that is associated with the b-level node 340 is incremented (because all of the c-level nodes 365-385 are child nodes of the second b-level node 340).

Each level may have a threshold number of child nodes (i.e., a child node threshold) that can be present before packets associated with a particular parent node are filtered (e.g., blocked). For example, suppose the c-level child node threshold is four. Thus, when the computer determines that the second b-level node 340 has five child nodes associated with it, the computer can determine to filter all packets meeting the IP address requirements of the second b-level node 340 (i.e., all packets having an a-level IP address of 100 and a b-level IP address of 51).

In one embodiment, a leakage parameter for each node (or each level or tree 300) is maintained. The leakage parameter is associated with the leaky bucket model and controls the decrementing of the overflow counter associated with a node. The leakage parameter corresponds to the normal flow of traffic. The leakage parameter may be a rate (e.g., decrement overflow counter for a particular node every five seconds). As a result of this decrementing (controlled by the leakage parameter), during one time period the node may be in an overflow state but, during another later time period, the node may not be in the overflow state due to the regular decrementing of the overflow counter according to the leaky bucket model. The leakage parameter, as well as the overflow threshold and/or child node threshold, may be a constant or may be dynamically adjusted (e.g., via a system administrator or user of the computer). In another embodiment, the overflow threshold is adjusted with time to allow for a natural evacuation of packets from a node (i.e., the overflow counter is decremented at, e.g., a given time).

One skilled in the art will recognize that circular clock arithmetic may be implemented to realize the leakage parameter at a low computing cost. For example, one maintains for each node two counters taking values in [0 . . . T−1], where T is the threshold of the node, with convention that the T−1 incremented by 1 yields 0 (circular arithmetics). One counter (CA) corresponds to the actual number of the packets arrived, and the other (CN) to the normal trajectory. The counter (CA) is incremented according to the actual arrivals; the counter (CN) according to the normal "leakage" rate. There are two possible collision modes (events that the counters value coincide): one is that (CA) attempts to overtake (CN)—in this case the threshold overflow is declared; the other is that (CN) attempts to overtake (CA), which corresponds to decrement of the overflow count to zero.

Further, nodes can be deleted from the tree once their overflow counter decrements to zero (or some predetermined number) due to the implementation of leakage as described above. As a result, the tree can trim itself so that, during times with little traffic, the tree may become smaller or even return to an empty tree with just the root node. Moreover, when there is a denial of service attack, once the attack from some subnet eases off, the subtree associated with that subset will eventually disappear, thereby freeing up resources to deal with other subnets being attacked.

In various embodiments, the filtering out of packets, which is performed, may be based on a hierarchical tree of various forms. For example, although the above-described example filtered based on the number of packets within a subset of IP addresses, other embodiments may use a tree structure to filter flows (e.g., TCP sessions).

Figure 4:
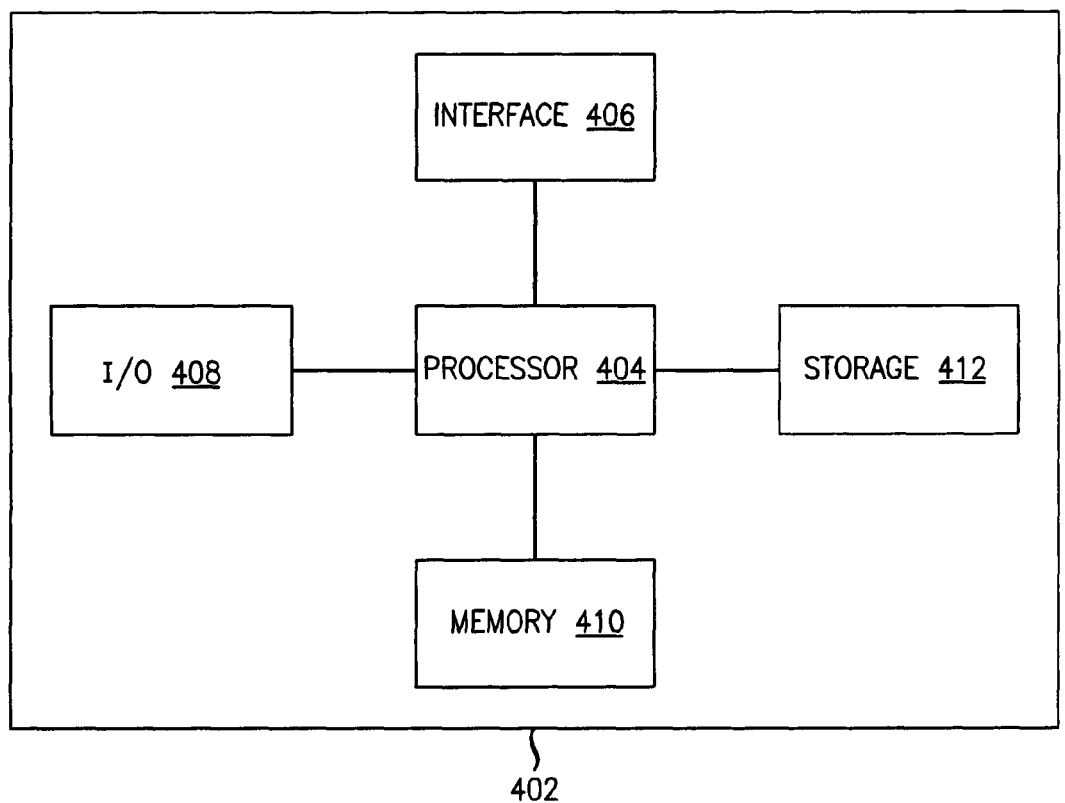
FIG. 4 is a high level block diagram of a computer in accordance with an embodiment.

The above description describes methods for implementing embodiments of the invention. The steps of these methods may be performed by an appropriately programmed digital computer or digital processor, configurations of such computers are well known in the art. An appropriate computer may be implemented, for example, using well known computer processors, memory units, storage devices, computer software, and other components. A high level block diagram of such a computer is shown in FIG. 4. Computer 402 contains a processor 404 which controls the overall operation of computer 402 by executing computer program instructions which define such operation. The computer program instructions may be stored in a storage device 412 (e.g., magnetic disk) and loaded into memory 410 when execution of the computer program instructions is desired. In particular, the program(s) stored on a data storage media, e.g., a memory or optical or magnetic disk, may include computer-executable instructions for performing the steps of any of the above-described methods. Computer 402 may also include one or more interfaces 406 for communicating with other devices (e.g., locally or via a network). Computer 402 may also include input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes. For example, computer 402 may represent the computer described above. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method, executed by a processor, for filtering out data packets received at a network address comprising:
storing, for each one of a set of values for a fixed segment of a source internet protocol (IP) address, a corresponding first number, each corresponding first number being indicative of a quantity of data packets received with the corresponding one of the set of values for the fixed segment of the source IP address thereof;
receiving a new data packet;
generating a child node associated with a particular one of the set of values for the fixed segment of the source IP address of the received new data packet if the first number corresponding to the particular one of the set of values for the fixed segment of the source IP address of the received new data packet is greater than a first threshold; and
discarding the received new data packet in response to (1) the first number corresponding to the particular one of the set of values for the fixed segment of the source IP address of the received new data packet being greater than the first threshold and (2) a number of child nodes associated with the particular one of the set of values for the fixed segment of the source IP address of the received new data packet being greater than a second threshold.

2. The method of claim 1, further comprising:
incrementing the first number corresponding to the particular one of the set of values for the fixed segment of the source IP address in response to the receipt of the new data packet and the first number corresponding to the particular one of the set of values being less than or equal to the first threshold.

3. The method of claim 2, wherein:
the incrementing is not performed while the first number corresponding to the particular one of the set of values for the fixed segment of the source IP address is greater than the first threshold.

4. The method of claim 1, further comprising:
storing a corresponding second number for each child node, each child node corresponding to one of values of a second set for a second fixed segment of the source IP address, each of the corresponding second numbers being indicative of a quantity of received data packets for which the second fixed segment of the source IP address thereof has the corresponding one of the values of the second set.

5. The method of claim 4, wherein the storing the corresponding second number for each child node is performed in response to a specific one of the first numbers being greater than the first threshold.

6. The method of claim 1, further comprising:
decrementing each corresponding first number according to a fixed rate.

7. The method of claim 1, wherein the discarding the received new data packet includes deleting the received new data packet.

8. An apparatus for filtering out data packets received at a network address comprising:
a node configured to store for each one of a set of values for a fixed segment of a source internet protocol (IP) address, a corresponding first number, each corresponding first number being indicative of a quantity of data packets received with the corresponding one of the set of values for the fixed segment of the source IP address thereof and to receive a new data packet, the node configured to generate a child node associated with a particular one of the set of values for the fixed segment of the source IP address of the received new data packet if the first number corresponding to the particular one of the set of values for the fixed segment of the source IP address of the received new data packet is greater than a first threshold; and the node configured to discard the received new data packet in response to (1) the first number corresponding to the particular one of the set of values for the fixed segment of the source IP address of the new data packet being greater than the first threshold and (2) a number of child nodes associated with the particular one of the set of values for the fixed segment of the source IP address of the received new data packet being greater than a second threshold.

9. The apparatus of claim 8, wherein the node is configured to increment the first number corresponding to the particular one of the set of values for the fixed segment of the source IP address in response to the receipt of the new data packet and the first number corresponding to the particular one of the set of values being less than or equal to the first threshold.

10. The apparatus of claim 9, wherein the node is configured to, not perform the incrementing while the first number corresponding to the particular one of the set of values for the fixed segment of the source IP address is greater than the first threshold.

11. The apparatus of claim 8, wherein the node is configured to store a corresponding second number for each child node, each child node corresponding to one of values of a second set for a second fixed segment of the source IP address, each of the corresponding second numbers being indicative of a quantity of received data packets for which the second fixed segment of the source IP address thereof has the corresponding one of the values of the second set.

12. The apparatus of claim 11, wherein the node is configured to store the corresponding second number for each child node in response to a specific one of the first numbers being greater than the first threshold.

13. The apparatus of claim 8, wherein the node is configured to:

decrement each corresponding first number according to a fixed rate.

14. The apparatus of claim 8, wherein the node is configured to discard the received new data packet by deleting the received data packet.

15. A non-transitory computer readable medium including instructions causing a processor to:

store for each one of a set of values for a fixed segment of a source IP address, a corresponding first number, each corresponding first number being indicative of a quantity of data packets received with the corresponding one of the set of values for the fixed segment of the source IP address thereof;

receive a new data packet;

generate a child node associated with a particular one of the set of values for the fixed segment of the source IP address of the received new data packet if the first number corresponding to the particular one of the set of values for the fixed segment of the source IP address of the received new data packet is greater than a first threshold; and discard the received new data packet in response to (1) the first number corresponding to the particular one of the values for the fixed segment of the source IP address of the received new data packet being greater than the first threshold and (2) a number of child nodes associated with the particular one of the set of values for the fixed segment of the source IP address of the received new data packet being greater than a second threshold.

16. The non-transitory computer readable medium of claim 15, wherein the instructions further control the processor to:

store a corresponding second number for each child node, each child node corresponding to one of values of a second set for a second fixed segment of the source IP address, each of the corresponding second numbers being indicative of a quantity of received data packets for which the second fixed segment of the source IP address thereof has the corresponding one of the values of the second set.

17. The non-transitory computer readable medium of claim 16, wherein the storing the corresponding second number for each child node performed in response to a specific one of the first numbers being greater than the first threshold.

18. The computer readable medium of claim 15, wherein the instructions further control the processor to:

decrement each corresponding first number according to a fixed rate.

19. The computer readable medium of claim 15, wherein the discarding the received new data packet includes deleting the received new data packet.

20. The computer readable medium of claim 15, wherein the instructions further control the processor to:

increment the first number corresponding to the particular one of the set of values for the fixed segment of the source IP address in response to the receipt of the new data packet and the first number corresponding to the particular one of the set of values being less than or equal to the first threshold.

21. The computer readable medium of claim 20, wherein the instructions further control the processor to:

not perform the incrementing while the first number corresponding to the particular one of the set of values for the fixed segment of the source IP address is greater than the first threshold.

* * * * *